(12) United States Patent
Fulghum et al.

(10) Patent No.: US 9,229,438 B2
(45) Date of Patent: Jan. 5, 2016

(54) SYSTEM RESPONSIVE TO MACHINE VIBRATIONS AND METHOD OF USE

(75) Inventors: Craig A. Fulghum, Rolle (CH); Randall R. Cox, Niwot, CO (US); Landon J. Cox, Monument, CO (US)

(73) Assignee: VIRTJOULE, INC., Monument, CO (US)

( * ) Notice: Subject to any disclaimer, the term of this patent is extended or adjusted under 35 U.S.C. 154(b) by 868 days.

(21) Appl. No.: 13/529,742

(22) Filed: Jun. 21, 2012

(65) Prior Publication Data

US 2012/0330579 A1 Dec. 27, 2012

Related U.S. Application Data

(60) Provisional application No. 61/500,141, filed on Jun. 23, 2011.

(51) Int. Cl.
| | | |
|---|---|---|
| G01F 17/00 | (2006.01) | |
| G05B 15/02 | (2006.01) | |
| G05B 23/02 | (2006.01) | |
| G01F 23/00 | (2006.01) | |

(52) U.S. Cl.
CPC ............ *G05B 15/02* (2013.01); *G05B 23/0224* (2013.01)

(58) Field of Classification Search
CPC ............ G06F 3/01; G05B 2219/37435; G05B 23/0224
See application file for complete search history.

(56) References Cited

U.S. PATENT DOCUMENTS

| | | | | |
|---|---|---|---|---|
| 8,224,576 B2* | 7/2012 | Jensen | .................. | G01D 9/005 702/116 |
| 2007/0069903 A1* | 3/2007 | Wehrs | ..................... | G01F 1/666 340/603 |

\* cited by examiner

*Primary Examiner* — Phuong Huynh
(74) *Attorney, Agent, or Firm* — Berenbaum Weinshienk PC

(57) ABSTRACT

A first embodiment of a system for measuring and analyzing a machine property comprises a vibration detector; power source; data transmitter, and first data processor which can obtain and convert sensed vibration data into digital data to be transmitted through the data transmitter to a system server which comprises software for processing and analyzing data comprising the received sensed vibration data. In a second embodiment, the system comprises a vibration sensor and a terminal used to obtain sensed vibration data from the sensor and convert it into digital data to be transmitted through the first data transceiver, and, optionally, to a system server. In this embodiment, data may be presented visually on the user display area and user input received input from the user input area.

16 Claims, 9 Drawing Sheets

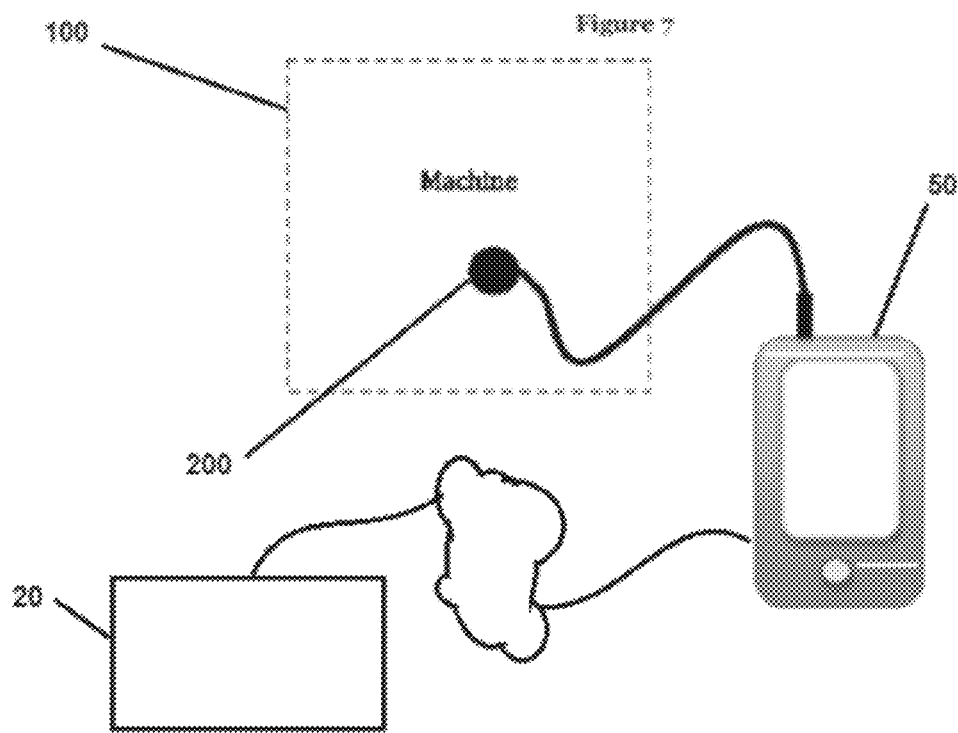

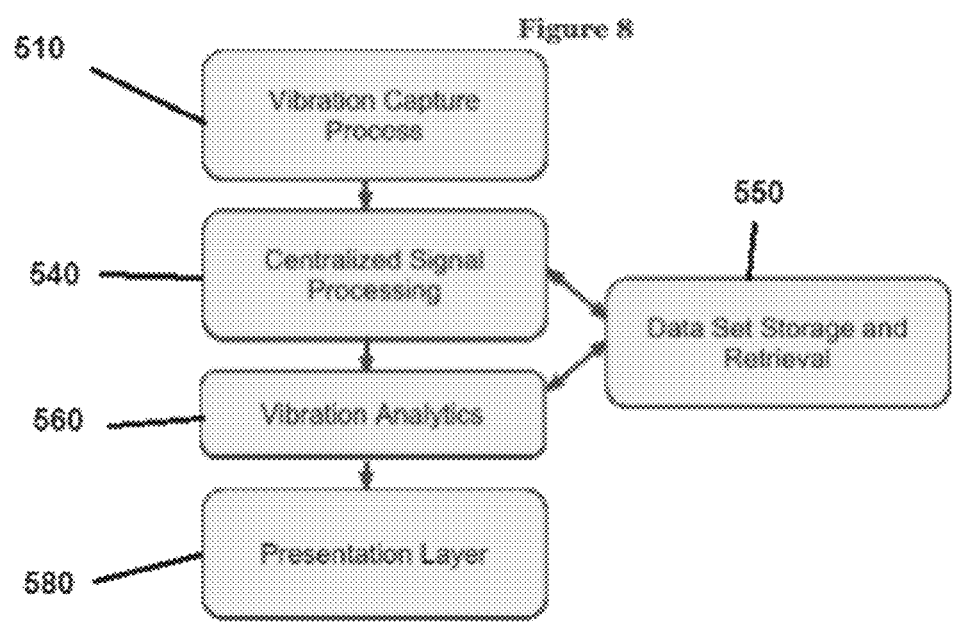

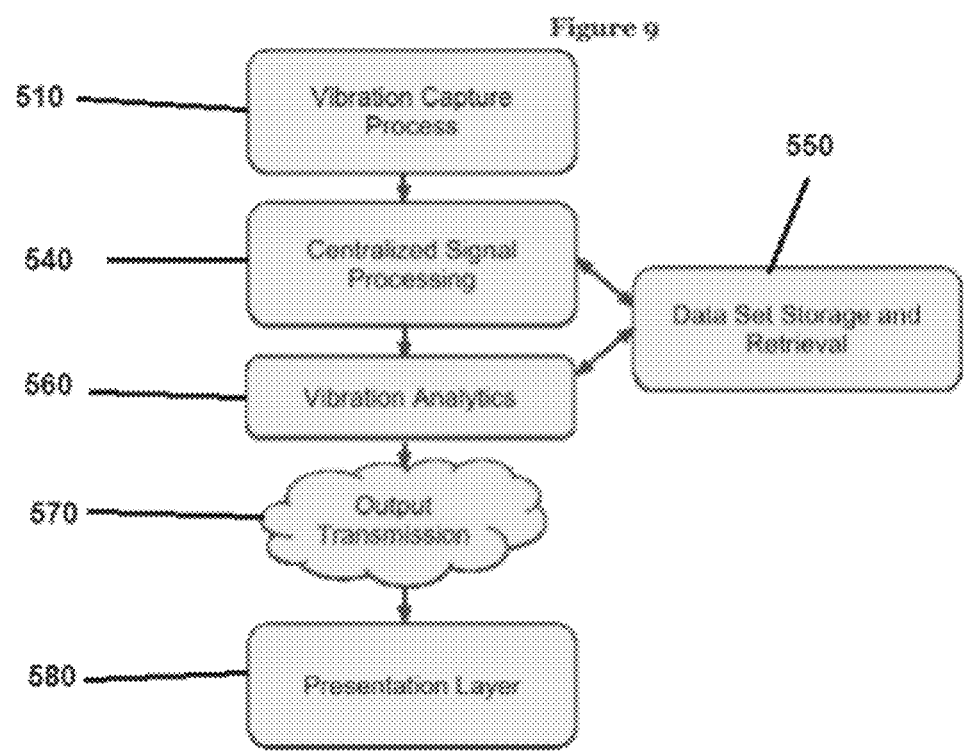

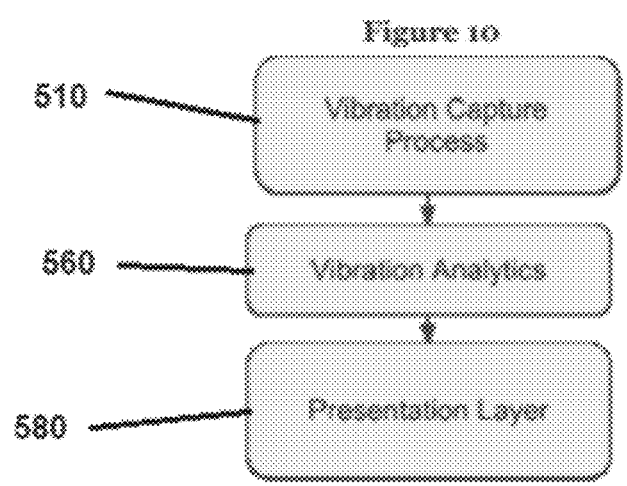

SYSTEM RESPONSIVE TO MACHINE VIBRATIONS AND METHOD OF USE

CROSS-REFERENCE TO RELATED APPLICATION

This application claims priority to and the benefit of U.S. Provisional Application No. 61/500,141 filed Jun. 23, 2011.

BACKGROUND

Typical monitoring systems are integrated with a building automation system and installed by a Heating/Ventilation/Air Conditioning ("HVAC") expert. Installation often involves installation of multiple, e.g. five or more, sensors installed inside the machine to measure temperatures and pressures. This process is often expensive and time consuming.

A need exists for relatively low cost sensor systems that can be installed by a layperson, including systems that comprise multiple processes and components that enable a layperson to perform real-time problem diagnosis and continuous monitoring of complex machinery.

DRAWINGS

The figures supplied herein disclose various embodiments of the claimed invention.

FIG. 7 is a drawing illustrating a mobile device with piezo electric transducer obtaining vibration signals from a machine;

FIG. 8 is a flow diagram illustrating a complete vibration system that can be installed on a mobile device;

FIG. 9 is a block diagram illustrating an embodiment where a majority of processing occurs locally but is connected via the internet such that the output is remotely presented to the end user; and FIG. 10 is a flow diagram illustrating the process that provides the end user enabling performance data while removing one or more processes illustrated in FIG. 3.

DETAILED DESCRIPTION OF EMBODIMENTS

In its various embodiments, the system obtains vibration and optionally other signals and takes advantage of both localized and distributed analysis as well as localized data (e.g. climate data, building management system data etc.) to detect machine faults or other suboptimal operating characteristics.

Figure 1:
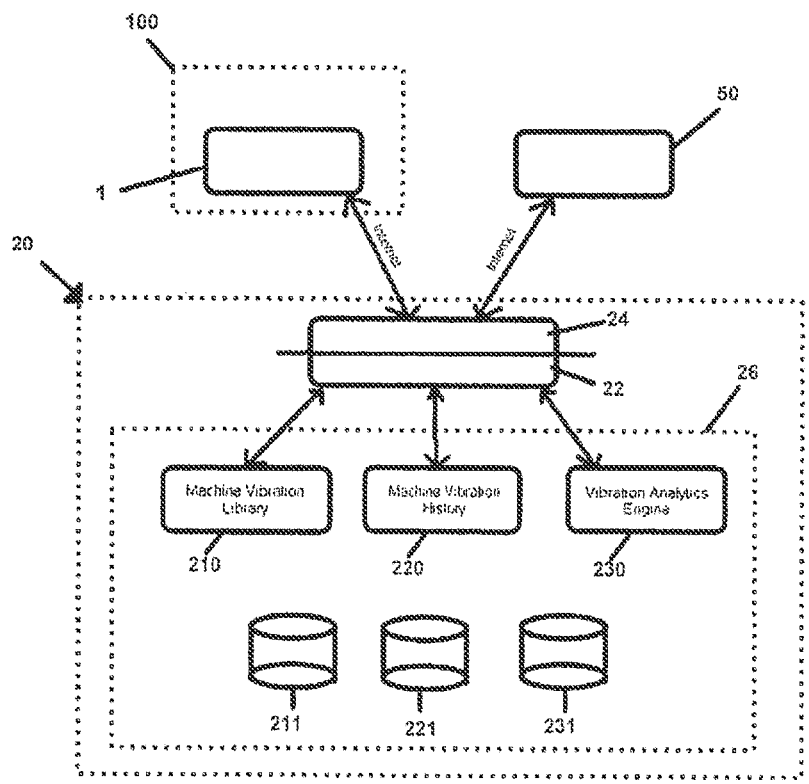
FIG. 1 is a block diagram illustrating examples of the machine vibration linking components.
Figure 2:
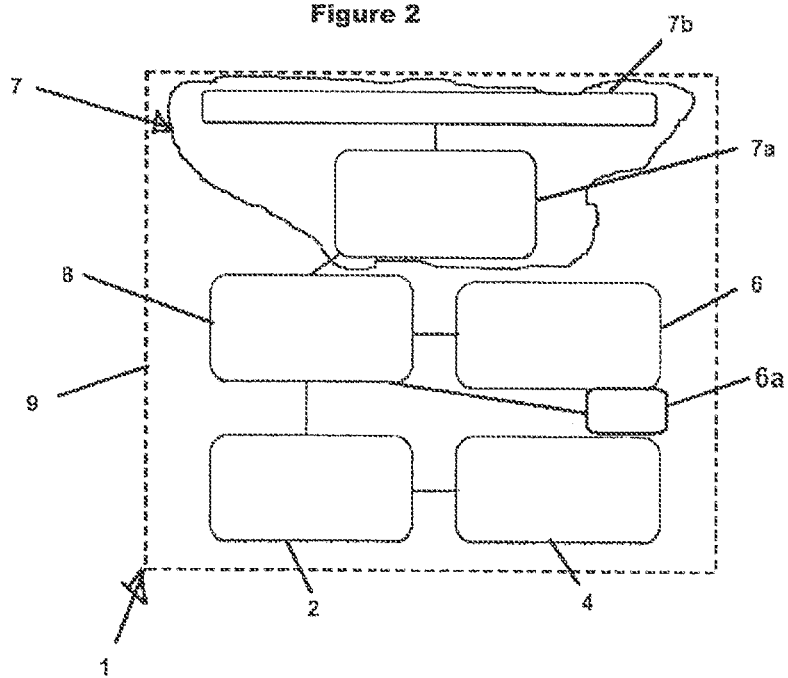
FIG. 2 is a block diagram illustrating machine vibration linking applications.

Referring now to FIGS. 1 and 2, in a first embodiment a system for measuring and analyzing a machine property comprises detector 1 and system server 20. FIG. 1 illustrates how various components may be connected through wired or wireless methods, e.g. via the Internet, using cellular technology, Ethernet, wireless, optical, radio transmission, or the like, or a combination thereof. As used herein, "machine property" includes vibration and may include other properties such as temperature, power usage, and the like, or combinations thereof.

In an embodiment, detector 1 further comprises power source 7 (which can include components 7a and 7b, as further discussed herein below); sensor 6 operatively connected to power source 7; data transmitter 4 operatively connected to power source 7; and first data processor 2 operatively connected to sensor 6, power source 7, and data transmitter 4.

In some embodiments, power source 7 can comprise battery 7a, solar cell 7b, or the like, or a combination thereof, where battery 7a may be further connected to solar cell 7b.

Data transmitter 4 can be a one-way transmitter or a two-way data transceiver. In either configuration, data transmitter 4 may transmit via a wired connection, a wireless connection, or the like, or a combination thereof. In this instance, wired and wireless include electromagnetic as well as acoustic or light energy.

Sensor 6 is typically dimensioned and configured to sense vibration of structural component 100 with which sensor 6 is operatively in contact. In currently envisioned embodiments, sensor 6 comprises a vibration transducer, a piezoelectric sensor, a microphone, an acoustic microphone, an accelerometer, or the like, or a combination thereof. First data processor 2 is typically configured and adapted to obtain at least sensed vibration data from sensor 6 and convert it into digital data to be transmitted through data transmitter 4.

In certain embodiments, detector 1 comprises second sensor 6a operatively connected to first data processor 2. Second sensor 6a is typically configured and dimensioned to sense a predetermined second physical characteristic relative to structural component 100. In currently contemplated embodiments, second sensor 6a may comprise a piezoelectric detector, a thermal imaging detector, a current sensor, a voltage sensor, a microphone, an acoustic microphone, an accelerometer, or the like, or a combination thereof. By way of example and not exclusion, second sensor 6a may comprise a current and/or voltage transducer operatively connected to a power line (not shown) leading to structural component 100. In such embodiments, the predetermined second physical characteristic may comprise sensed voltage and/or current in the power line and first data processor 2 is further configured and adapted to obtain the sensed voltage and/or current in the power line and convert it into data to be transmitted through data transmitter 4. By way of further example and not exclusion, the predetermined second physical characteristic may be a raw signal voltage, a signal FFT, a signal strength, a decibel level, a signal pattern, a GPS location, local realtime/historic climate data, temperature, wind direction/speed, humidity, a weather condition, a whole building measurement, a unit electric measurement, a natural gas measurement, an inside space condition, a thermostat function, a thermostat history, or the like, or a combination thereof.

System server 20 is operatively in communication with detector 1 and further comprises second data processor 22; data receiver 24 operatively connected to second data processor 22; and software (e.g., 210,220,230) operatively resident in data store 26 which is operatively in communication with second data processor 22, e.g. a hard drive, an optical drive, RAM, ROM, or the like, or a combination thereof. System server 20 may comprise one or more personal computers, embedded computers, personal digital assistants, or the like and the included computers may be standalone or networked. The software is dimensioned and configured to process and analyze data comprising the sensed vibration data received via data receiver 24.

Figure 3:
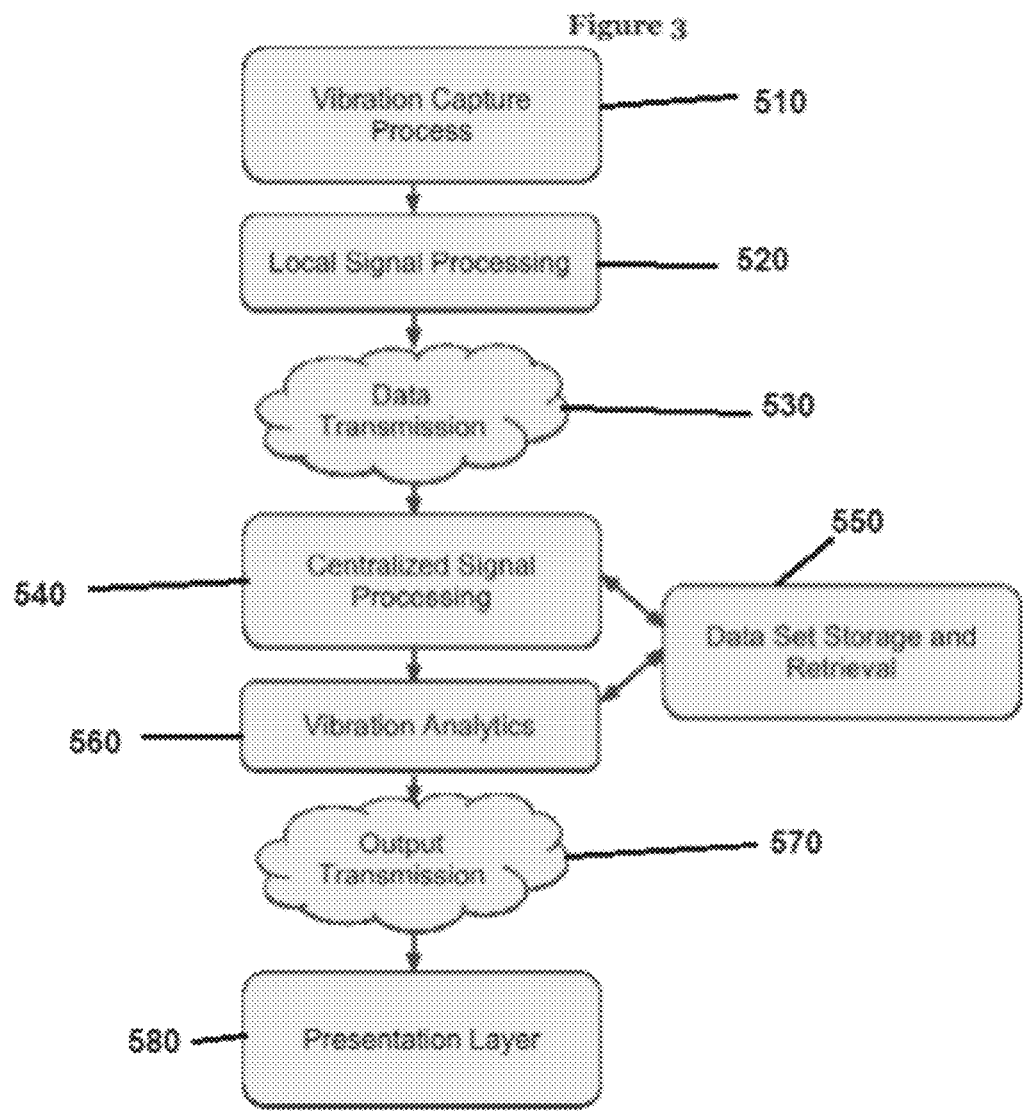
FIG. 3 is a flow diagram illustrating implementation of invention.

Data store 26 typically comprises historical vibration database 221, realtime vibration database 231, vibration fault library 210, or the like, or a combination thereof. Vibration data can be stored in one or more of these databases. Processed data may be stored in vibration fault library 210 for utilization in the vibration analytics process (FIG. 1 and FIG. 3). Vibration analytics can use a variety of techniques to determine the performance and relevance of the machine vibration. These techniques may include statistical techniques utilizing historical, comparative (similar machines, faults, etc) realtime or simulated data sets. The statistical techniques may include but are not limited to basic regression analysis, pattern recognition, Bayesian networks, etc. These techniques may or may not use referenced data sets to determine machine performance. In addition, other numerical analysis methods can be used. (FIG. 1 and FIG. 3).

Detector 1 may be configured and dimensioned as a selectively detachable device, a permanently attached device, a device externally mountable to structural component 100, a device externally mountable to structural component 100, a selectively embedded device, or a permanently embedded device as well as a hardwired device that may be incorporated into these systems and devices. The mobile device may capture analog vibration through existing embedded sensors (microphone, accelerometer, etc) typically found on mobile devices such as smart phones or may utilize additional inputs/hardware attached to the device such as an external sensor (accelerometer, microphone, piezio electric transducer, etc). In addition the vibration input may be subjected to amplification devices.

In other configurations, detector 1 may further comprise A/D converter 8 operatively in communication with sensor 6 or sensor 6a and first data processor 2. Detector 1 may further comprise an amplifier (not shown) operatively connected to sensor 6 and/or sensor 6a where the amplifier is adapted to amplify the information received by sensor 6 and/or sensor 6a.

In other configurations, detector 1 may further comprise housing 9 where power source 7, sensor 6, data transmitter 4, and first data processor 2 are at least partially disposed within housing 9.

In certain embodiments, terminal 50 is operatively in communication with detector 1 and/or system server 20. Terminal 50 may be a personal computer, a smart phone, a mobile phone, a personal digital assistant (PDA), a dedicated mobile device, a tablet computing device, or the like. Terminal 50 is typically operatively in communication with server system 20 and further adapted and configured to receive a request from a user.

In addition to the above described embodiment, other embodiments exist that are responsive to machine vibrations. One additional embodiment exists where all processes and databases reside on a mobile device, e.g. terminal 50 (FIG. 7), or a dedicated embedded device, e.g. detector 1. In another embodiment, a majority of processing occurs locally, e.g. terminal 50 and/or detector 1 (FIG. 7), but the local device is connected via the Internet to, e.g. system server 20 which processes the data and directs the output to an end user. Other, additional embodiments exist wherein one or more processes, such as those outlined in FIG. 3, are removed from the process but still provide the required performance information to the end user.

By way of example and not limitation, referring to FIG. 7, in a second embodiment the system for measuring and analyzing a machine property comprises sensor 200 dimensioned and configured to sense vibration of structural component 100 with which sensor 200 is operatively in contact and terminal 50. Terminal 50 may be operatively in communication with system server 20 or, in other currently considered embodiments, process some or all data obtained from sensor 200 itself.

Figure 4:
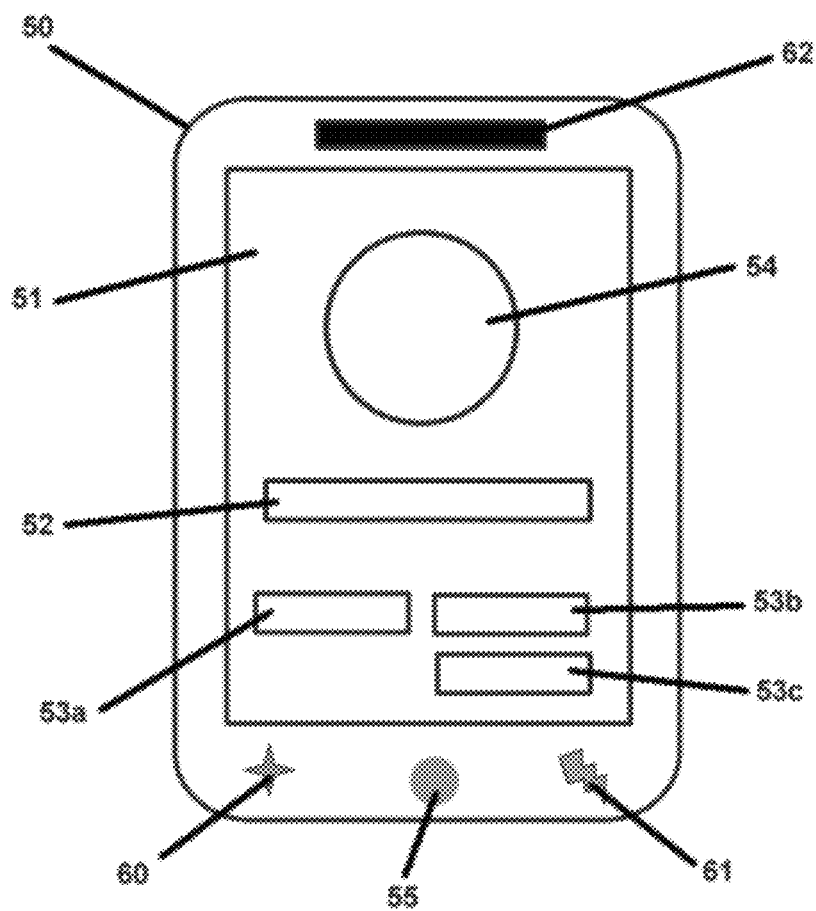
FIG. 4 is a screenshot illustrating the vibration capture screen on a mobile device.
Figure 5:
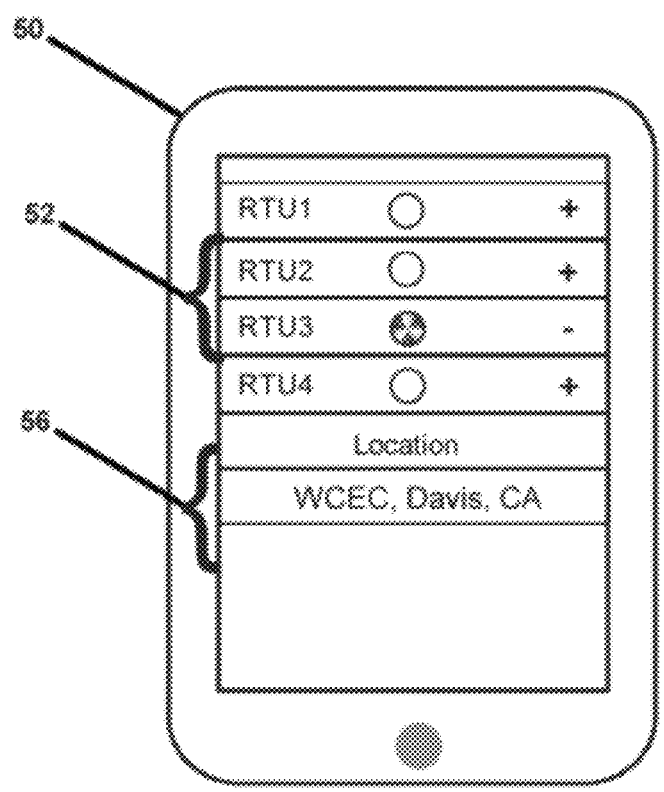
FIG. 5 is a screenshot illustrating the summary view on a mobile device.
Figure 6:
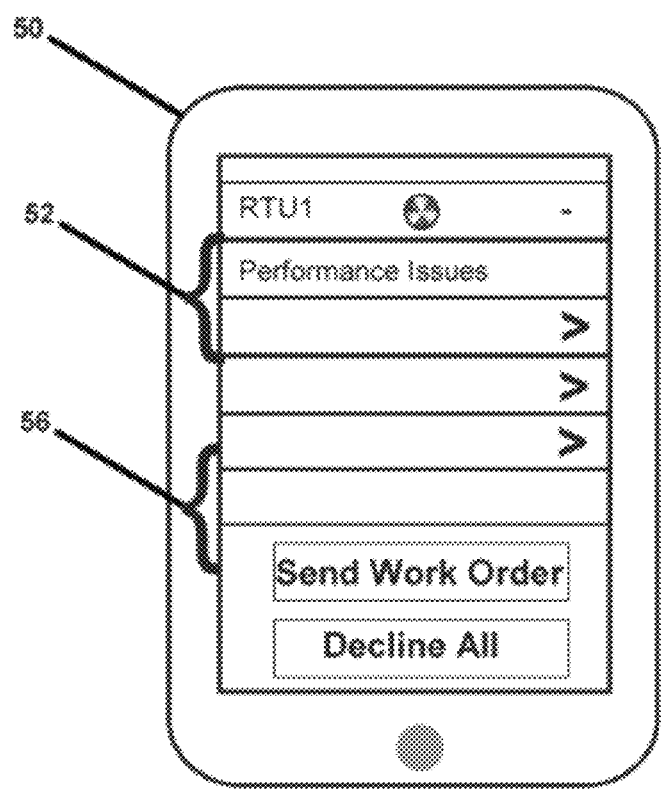
FIG. 6 is a screenshot illustrating the presentation layer on a mobile device.

Referring additionally to FIGS. 4-6, terminal 50 typically comprises power source 60, first data transceiver 61 operatively connected to power source 60; a user interface unit comprising user display area 52 which may further comprise user regions 52a-52d, one or more of which may comprise a user input area, e.g. 52e; and first data processor 62 operatively connected to sensor 200, power source 60, user interface unit 51, and first data transceiver 61.

In this embodiment, first data processor 62 is configured and adapted to obtain sensed vibration data from sensor 200, either via a wired or wireless connection, and convert the vibration data into digital data. These data may be processed locally by first data processor 62, transmitted through first data transceiver 61 for processing, or a combination thereof. In addition, first data processor 62 may process the vibration and other data, either from local data, remote data, or a combination thereof, and can further include processing data for visual presentment on user display area 52. Some data, e.g. user input, may be obtained, e.g. from user input area 52e, and further processed by first data processor 62, system server 20, or a combination thereof.

Information provided by the above processes can be included in a presentation layer to the end user. The presentation layer can be delivered through a web browser, native device application, or any suitable application. The presentation layer may be located on the mobile device (FIG. 5 and FIG. 6), the embedded device, a computer, a thermostat, a device network/hardwire connected to terminal 1, or the like, or a combination thereof.

System server 20 is typically similar to system server 20 already described above and further typically comprises second data processor 22; second data transceiver 24 operatively connected to second data processor 22; and software operatively resident in second data processor 22. The software is typically configured to process and analyze data received via second data transceiver 24 where the received data comprises the sensed vibration data and/or user input. For clarity, although system server 20 is essentially identical to that described for the first embodiment herein, the "second" description is meant only to distinguish between its elements and those similar elements present in terminal 50.

In the operation of preferred embodiments, the system may be used to create timely notifications and easy-to-understand reports on a probable cause of a fault without the need for deep diagnostic or analytical expertise from an operator and associated expense. For example, the system enables non-technical people, for example a building owner, to discover inefficiencies with heating and air conditioning systems. Because the system is non-invasive, it can be installed to monitor less costly machinery at higher unit volumes making it economical to monitor and fix problems that cannot currently be discovered or addressed.

As described further below, a signal processing and analytics process is used to connect a vibration related signal with metadata and/or programmatic or device actions. In the context of this document, the term "vibration object" refers to a computer object form of a vibration signal. The linking of a vibration object applies to machines that are used in residential (e.g., refrigerators, heating/ventilation/air-conditioning (HVAC) systems), commercial (rooftop units (RTUs), chillers, fans, etc.), and/or industrial applications (generators, assembly lines, refining operations, etc).

Referring now to FIG. 3, in one embodiment, vibration data can be processed at least partially at a local device, e.g. detector 1 (FIG. 1) or and/or terminal 50 (FIGS. 1 and 7). Local signal processing can occur in real time or can be stored for processing on the local device at a later time. Local signal processing can extract, compress, and store relevant vibration information for transmission to a centralized signal processing server. Relevant vibration data outputs can include raw signal voltage, signal FFT, signal strength, decibel level, and signal patterns. This information is then used to determine machine performance. In addition to local signal processing, additional local information can be embedded into the vibration object (this can occur during centralized signal processing as well). Additional information can include, but is not limited to: GPS location, local realtime/historic climate data (temperature, wind direction/speed, humidity, weather etc), whole building/unit electric/natural gas measurements, inside space conditions and thermostat functions/history.

Processed and unprocessed vibration data can be transmitted to, e.g. system server 20, via the Internet. Transmission methods may include but are not limited to cell technology, wireless Internet, Ethernet, radio transmission, or the like, or a combination thereof. Data may be transferred as one packet of information or multiple packets of information.

Referring still to FIG. 3, in a first contemplated method a machine property, e.g. vibration, may be measured and by placing detector 1 (FIG. 1) into contact with structural component 100 (FIG. 1), where detector 1 is as described herein above. Vibration of structural component 100 is sensed, step 510, using sensor 6 (FIG. 1). At step 520, sensed vibration data are converted into digital data. At step 530, these digital data, along with any other data to be sent, are transmitted to system server 20 (FIG. 1), which is as described herein above. Software resident at system server 20 compares, at step 540, the digital data against a predetermined set of comparison data. In certain embodiments, a vibration object is used, at step 560, to model the sensed vibration, although other data processing techniques may be used to implement step 560. Based on the outcome of step 560, a reporting action may be initiated if the digital data meet a predetermined action threshold, including in real time or at predetermined intervals, e.g. monthly.

In certain embodiments, the software in system server 20 (FIG. 1) further comprises vibration analytics engine 230 (FIG. 1), which at step 560 includes modeling the digital data using the vibration analytics engine.

The digital data may be processed in system server 20 (FIG. 1) using constellation mapping, Fast Fourier Transform, a data integrity post processing technique, basic regression analysis, pattern recognition, Bayesian networks, numerical analysis methods, or the like, or a combination thereof.

System server data store 26 (FIG. 1) typically comprises historical vibration database 221 (FIG. 1), realtime vibration database 231 (FIG. 1), vibration fault library 211 (FIG. 1), or the like, or a combination thereof, and the digital data may be stored, at step 550, in historical vibration database 221, realtime vibration database 231, and/or vibration fault library 211.

For embodiments where system server 20 (FIG. 1) is paired with a locally processing terminal 50 (FIG. 7), second data processor 62 may be further adapted and configured to issue an operative command, e.g. via second data transceiver 64 to first data transceiver 54, and first data processor 52 may be further adapted and configured to respond to a received operative command. In these configurations, the software in system server 20 may further comprise diagnostic software useful to diagnose a fault condition based on the compared digital data in the system server. If a fault is diagnosed, system server 20 may generate a command operative to effect a change to structural component 100 (FIG. 7) and send the command to detector 1, e.g. via second data transceiver 64 to first data transceiver 54. Once received at detector 1, detector 1 may then initiate an action in response to the received command.

The reporting action may comprise generating a report, issuing a command, issuing an alert, or the like, or a combination thereof. In addition, initiating of the reporting action may further comprise generating, at step 580, one or more descriptions of structural component 100 (FIG. 1). By way of example and not limitation, a first description may describe the digital data which meet the predetermined action threshold and a second description may describe an action to be taken based on the digital data which meet the predetermined action threshold. The second descriptions may also comprise economic data, a suggested action, location data, or the like, or a combination thereof, associated with structural component 100. These additional descriptions may be transmitted to and displayed at terminal 50 (FIG. 1).

The result report may include machine performance data such as run time, mean time to failure, component disaggregation, mechanical degradation, power efficiency, comparative data (similar machines, etc), mechanical fault probability, work order information, fault cost, or the like, or a combination thereof.

In certain embodiments, the result report information may also be integrated with a work order management system to be used by a maintenance contractor, facility manager or any suitable end user of the information.

A user may also initiate an action request, whether or not in response to a request from system server 20 (FIG. 1) and communicate the user action request to system server 20. This in turn may cause system server 20 to initiate a reporting action and/or issue a command to detector 1. By way of example and not limitation, a user may be presented, on user interface system 51 (FIG. 7), with a predetermined set of actions to be undertaken and select a desired action. This selection is transmitted to system server 20 which then receives the selection of one of the predetermined set of actions. Based on the received selection, system server 20 generates one or more commands operative to effect the selected action if the received selection is to perform the selected action and sends the one or more commands to detector 1. Once received at detector 1, the one or more commands trigger detector 1 to initiate an action) in response to the received command.

In certain embodiments, terminal 50 (FIG. 1) is located remotely from detector 50 and detector 1 (FIG. 1) and terminal 50 communicate wirelessly.

In a second contemplated method, one or more machine properties are measured and analyzed by placing sensor 200 (FIG. 7) into contact with structural component 100 (FIG. 7) and operatively connecting sensor 200 to terminal 50 (FIG. 7), where terminal 50 is as described herein above. A vibration property of structural component 100 is sensed at a predetermined interval and the sensed vibration converted into digital data by terminal 50. The converted data, along with other data as required, are transmitted to system server 20, which is as described above. Software resident in system server 20 compares the received data against a predetermined set of comparison data and the vibration data modeled in the vibration object. A reporting action is initiated if the data meet a predetermined action threshold. A result of the reporting action is sent to and displayed on the terminal user display area. This transmission to terminal 50 may be via the Internet, e.g. using cellular telephony technology, wireless transmission such as WiFi or Bluetooth®, wired methods such as Ethernet, and the like, or a combination thereof.

For the sake of illustration, the disclosure focuses on a specific vibration object, vibration signals from a contact transducer attached to HVAC equipment (e.g., an RTU, chiller, fans, or the like). However, the system and its components and processes can also apply to other types of machine vibration signals, including residential, industrial and commercial equipment.

The foregoing disclosure and description of the inventions are illustrative and explanatory. Various changes in the size, shape, and materials, as well as in the details of the illustrative construction and/or an illustrative method may be made without departing from the spirit of the invention.

What is claimed is:

1. A system for sensing and analyzing a vibration of a structural component, comprising:
   a) a detector, the detector further comprising:
      i) a power source;
      ii) a sensor operatively connected to the power source, the sensor dimensioned and configured to sense vibration of a structural component with which the sensor is operatively in contact;
      iii) a data transmitter operatively connected to the power source; and
      iv) a first data processor operatively connected to the sensor, the power source, and the data transmitter, the first data processor configured and adapted to obtain sensed vibration data from the sensor and convert it into digital data to be transmitted through the data transmitter; and
   b) a system server operatively in communication with the detector, the system server further comprising:
      i) a second data processor;
      ii) a data receiver operatively connected to the second data processor; and
      iii) software operatively resident in the second data processor, the software dimensioned and configured to process and analyze data comprising the sensed vibration data received via the data receiver.

2. The system of claim 1, wherein the power source comprises at least one of a solar cell or a battery.

3. The system of claim 1, wherein the detector further comprises an A/D converter operatively in communication with the sensor and the first data processor.

4. The system of claim 1, wherein the sensor comprises at least one of a vibration transducer, a piezoelectric sensor, a microphone, an acoustic microphone, or an accelerometer.

5. The system of claim 1, wherein the detector comprises a second sensor operatively connected to the first data processor, the second sensor configured and dimensioned to sense a predetermined second physical characteristic relative to the structural component.

6. The system of claim 5, wherein:
   a) the second sensor comprises a current transducer operatively connected to a power line leading to the structural component;
   b) the predetermined second physical characteristic comprises sensed current in the power line; and
   c) the first data processor is further configured and adapted to obtain the sensed current in the power line and convert it into data to be transmitted through the data transmitter.

7. The system of claim 5, wherein the second sensor comprises at least one of a piezoelectric detector, a thermal imaging detector, a microphone, an acoustic microphone, an accelerometer, or a current transducer.

8. The system of claim 1, wherein the data transmitter comprises a data transceiver.

9. The system of claim 1, wherein the detector is configured and dimensioned as at least one of a selectively detachable detector, a permanently attached detector, a detector externally mountable to the structural component, a detector externally mountable to the structural component, a selectively embedded detector, or a permanently embedded detector.

10. The system of claim 1, wherein the server further comprises a data store operatively connected to the second data processor, the data store further comprising at least one of a historical vibration database, a realtime vibration database, and a vibration fault library.

11. The system of claim 1, further comprising a terminal operatively in communication with the server system.

12. The system of claim 1, wherein:
    a) the detector further comprises a housing; and
    b) the power source, sensor, data transmitter, and first data processor are at least partially disposed within the housing.

13. The system of claim 12, wherein the housing is dimensioned and configured to protect elements disposed within the housing from environmental hazards.

14. A system for sensing and analyzing a vibration of a structural component, comprising:
    a) a sensor dimensioned and configured to sense vibration of a structural component with which the sensor is operatively in contact; and
    b) a terminal, comprising
       i) a housing;
       ii) a power source at least partially disposed within the housing;
       iii) a first data transceiver at least partially disposed within the housing and operatively connected to the power source;
       iv) a user interface unit at least partially disposed within the housing, comprising:
          (1) a user display area; and
          (2) a user input area; and
       v) a first data processor at least partially disposed within the housing and operatively connected to the sensor, the power source, the display, the user interface unit, and the first data transceiver, the first data processor configured and adapted to:
          (1) obtain sensed vibration data from the sensor and convert it into digital data to be transmitted through the first data transceiver;
          (2) present data visually on the user display area; and
          (3) receive input from the user input area.

15. The system of claim 14, further comprising a system server operatively in communication with the terminal, the system server further comprising:
    i) a second data processor;
    ii) a second data transceiver operatively connected to the second data processor; and
    iii) software operatively resident in the second data processor, the software dimensioned and configured to process and analyze data received via the data receiver, the received data comprising the sensed vibration data.

16. The system of claim 14, wherein the housing is dimensioned and configured to protect elements disposed within the housing from environmental hazards.

* * * * *